(12) United States Patent
Leach et al.

(10) Patent No.: US 10,798,949 B2
(45) Date of Patent: Oct. 13, 2020

(54) APPARATUS AND METHOD FOR THE DECORATION OF FOODSTUFFS

(71) Applicant: Conopco, Inc., Englewood Cliffs, NJ (US)

(72) Inventors: James Richard Hughes Leach, St Neots (GB); Jonathan David Morley, Letchworth (GB)

(73) Assignee: Conopco, Inc., Englewood Cliffs, NJ (US)

(*) Notice: Subject to any disclaimer, the term of this patent is extended or adjusted under 35 U.S.C. 154(b) by 499 days.

(21) Appl. No.: 15/319,901

(22) PCT Filed: Jun. 2, 2015

(86) PCT No.: PCT/EP2015/062288
§ 371 (c)(1),
(2) Date: Dec. 19, 2016

(87) PCT Pub. No.: WO2015/197323
PCT Pub. Date: Dec. 30, 2015

(65) Prior Publication Data
US 2017/0181445 A1    Jun. 29, 2017

(30) Foreign Application Priority Data
Jun. 27, 2014 (EP) .................................. 14174672

(51) Int. Cl.
*A23G 3/28* (2006.01)
*A21D 13/47* (2017.01)
(Continued)

(52) U.S. Cl.
CPC ............... *A23G 3/28* (2013.01); *A21D 13/45* (2017.01); *A21D 13/47* (2017.01); *A23G 3/0097* (2013.01)

(58) Field of Classification Search
CPC ........ H01S 3/22; H01S 3/2223; H01S 3/0071; H01S 3/10; H01S 3/101; A21D 13/47; A21D 13/45; A23G 3/28
See application file for complete search history.

(56) References Cited

U.S. PATENT DOCUMENTS

| 5,897,797 A | 4/1999 | Drouillard et al. |
| 2003/0186001 A1 | 10/2003 | Khan |

(Continued)

FOREIGN PATENT DOCUMENTS

| DE | 3803261 | 9/1988 |
| DE | 19646813 | 8/1997 |

(Continued)

OTHER PUBLICATIONS

Search Report in EP14174672, dated Nov. 28, 2014.
(Continued)

*Primary Examiner* — Armando Rodriguez
(74) *Attorney, Agent, or Firm* — Gerard J. McGowan, Jr.

(57) ABSTRACT

The present invention provides a wafer product decorating apparatus comprising a laser, a collimator, at least one galvanometer driven mirror, and an aspheric scan lens, the apparatus being positionable relative to the wafer product to be decorated wherein the apparatus is configured to provide a laser beam having a spot size of from 100 to 750 μm in diameter on the surface of the product to be decorated and a substantially flat focal plane, characterised in that the focal plane has a depth of field of from 5 mm to 20 mm and that the focal plane of the laser beam is from 5 mm to 30 mm above or below the surface of the product to be decorated. The invention also provides a process for decorating a wafer product.

7 Claims, 3 Drawing Sheets

(51) Int. Cl.
*A21D 13/45* (2017.01)
*A23G 3/34* (2006.01)

(56) References Cited

U.S. PATENT DOCUMENTS

| | | | | |
|---|---|---|---|---|
| 2004/0091588 | A1* | 5/2004 | Li | A01J 21/00 426/248 |
| 2005/0276887 | A1 | 12/2005 | Weidenmann | |
| 2008/0035616 | A1 | 2/2008 | Muller et al. | |
| 2008/0131563 | A1 | 6/2008 | Kasperchik et al. | |
| 2010/0080876 | A1* | 4/2010 | Goick | A21C 15/005 426/383 |
| 2010/0200522 | A1* | 8/2010 | Tischendorf | C02F 1/001 210/798 |
| 2010/0200552 | A1* | 8/2010 | Mienhardt | B23K 26/046 219/121.72 |
| 2015/0030731 | A1* | 1/2015 | Zighelboim | B41J 2/47 426/241 |
| 2015/0049593 | A1* | 2/2015 | Oliveira | B44C 1/228 368/276 |
| 2015/0099043 | A1* | 4/2015 | Ellison | A23L 5/30 426/231 |
| 2016/0249647 | A1* | 9/2016 | Cuny | A21C 15/00 426/237 |
| 2018/0297117 | A1* | 10/2018 | Kanko | B28B 1/001 |

FOREIGN PATENT DOCUMENTS

| | | |
|---|---|---|
| DE | 19730887 | 1/1999 |
| DE | 19851379 | 5/2000 |
| DE | 3836821 | 4/2001 |
| DE | 102006037922 | 2/2008 |
| EP | 1604572 | 12/2005 |
| JP | 2002113585 | 4/2002 |
| JP | 2005138140 | 6/2005 |
| JP | 2006248237 | 9/2006 |
| NL | 9402168 | 8/1996 |
| TW | M437065 | 11/2012 |
| WO | WO02068205 | 9/2002 |
| WO | WO2006129078 | 12/2006 |
| WO | WO2006129086 | 12/2006 |

OTHER PUBLICATIONS

Search Report in EP14174672, dated Dec. 8, 2014.
Search Report in PCTEP2015062288, dated Sep. 4, 2015.
Written Opinion in EP14174672, dated Dec. 8, 2014.
Written Opinion in PCTEP2015062288, dated Sep. 4, 2015.
Written Opinion in EP14174672; dated Nov. 28, 2014.
Lu Xijia; High-tech Encyclopedia Dictionary; High-tech Encyclopedia Dictionary; Nov. 1994; Manual Translation of p. 1344 only; fujian people's publishing house; China.

* cited by examiner

APPARATUS AND METHOD FOR THE DECORATION OF FOODSTUFFS

TECHNICAL FIELD OF THE INVENTION

The present invention relates to an apparatus and process for the decoration of wafer based foodstuffs, including edible receptacles for frozen confections such as ice cream cones. In particular, it relates to an apparatus and process for the decoration of such foodstuffs that utilises laser technology.

BACKGROUND TO THE INVENTION

Wafers are a well liked by consumers who find them to be an interesting component of various food products including baked goods, confectionaries and frozen products. Wafers can be used to add interesting features of texture, structure and flavour to the products that they are part of. Wafers are made from a batter which is largely composed of flour, sugar, fat and/or oil, and water. Once the ingredients have been mixed the batter is poured onto a baking plate, typically a metal surface heated to a temperature in excess of 200° C. During baking most of the water is driven off as steam. Due to the high sugar content of the wafers they are relatively plastic and flexible at the high temperature of the baking plate. Immediately after baking, the wafers can be left flat to provide wafer sheets which can be used as sandwiching layers or as surface decoration for products. Alternatively, they can be formed into a receptacle by shaping the flexible wafer with a forming element such as a mandrel to form edible receptacles such as tacos, shells, cups or cones. The surface of the wafer can be smooth and flat but more typically has a waffle texture caused by the baking plates which have a grid-like structure on their surfaces to prevent the wafer batter from sticking to them.

Although well liked by consumers, wafers are a very well known product and consumers are continually looking for new eating experiences. Conventional wafers may be perceived as somewhat old fashioned and uninteresting. As a consequence, techniques have been developed to enhance the appearance of wafer based products by providing decorations on the surface. An example of such a technique is stamping or embossing which is used to imprint a decoration into the surface structure of the wafer. However, changing the wafer surface can detract from the waffle structure that is expected by the consumers while embossing and stamping are also time consuming processes which need to be carried out while the wafer is still plastic and flexible at the high temperature of the baking plate and can therefore interfere with the subsequent steps to form the wafer into shapes such as cones. Other wafer decorating approaches include spraying, inkjet printing, transfers and such techniques which can be used to introduce additional coloured materials and ingredients onto the surface of a wafer. However such techniques introduce additives that can detract from the normal natural ingredients of the wafer and can be unacceptable to consumers, especially in the context of children's products. Moreover, introducing decorations onto shaped wafer products such as cones is not straightforward because in addition to the waffle-like grid pattern as discussed above the surfaces will also be curved and sloping which causes further issues with these techniques.

There is therefore a need for an approach that does not suffer from the issues associated with stamping and embossing and that is capable of creating decorations on the surface of wafers through the use of colour changes or shading without the use of additives. One approach that allows the colour of the wafer surface to be changed without the use of additives involves the use of a pyrographic approach in which a heated stamp is applied to the surface of the wafer such that the carbohydrates and sugars in the wafer undergo a colour change to a darker colour and therefore a contrasting pattern or decoration can be created from the pattern of the stamp. However, this approach still suffers the same drawbacks as traditional stamping, for example it is still a time consuming approach, there is no flexibility in changing the design of the decoration without changing the stamps themselves and it can interfere with the subsequent shaping steps of the wafer.

Other approaches have been disclosed which use laser technology to directly heat the surface of the wafer itself, further cooking the wafer to darken the material and create a contrasting pattern or decoration. DE3836821 and DE3803261 disclose surface labelling by heat treatment carried out by means of a laser in which masks are used to define the shape of the decoration to be applied. The masks contain openings akin to a stencil and the laser is then applied across the mask. When the laser passes over an opening it interacts with the surface of the product causing heating and therefore colour change. However, the use of masks or stencils limits the decorations that can be achieved—a different mask must be used for each different design. They also require additional apparatus and processing steps in order to place the mask onto the product prior to laser heating and remove it afterwards which results in increases in cost and decreases in line speed. Moreover, not only is it necessary to provide a different mask for each different design, it is also necessary to provide a different mask for each different product shape to be decorated. For example, when decorating a flat wafer, a flat mask can be used but when the product is, for example, a cone then the shape of the mask must correspond to the curved surface and tapering shape of this type of product.

It would therefore be preferred to decorate products without the use of masks. Improvements in laser technology now allow for specific images to be created without the use of masks in a process called laser engraving. Laser engraving apparatus typically consists of two main parts: a laser source and a controller. The laser source emits a laser beam and the controller controls the direction, intensity, speed of movement, and spread of the laser beam over the surface to be engraved. In the more common configuration both the laser and the surface to be decorated are stationary and galvo mirrors move the laser beam over the surface. Laser engravers using this technology can work in either raster or vector mode. In laser engraving, the point where the laser touches the surface is the focal point of the laser, i.e. the surface to be decorated is positioned inside the focal plane of the laser beam where the laser spot is at its smallest size and at its maximal power. This focal point is very small, for example less than 50 µm, and only the area inside this focal point is affected when the laser beam passes over the surface. The energy of the laser heats up the surface under the focal point and subsequently the material is ablated either due to vaporisation of the material, or due to the material fracturing and flaking off. As the surface material is ablated, debris must then be removed from the surface to allow the laser to continue engraving. Since the position of the laser is determined by the controller no masks are needed in laser engraving, nor is it necessary to add barriers to the surface to prevent the laser from deviating from the pattern of the decoration to be applied. These techniques therefore allow for the production of a wide range of detailed decorations in a rapid and controllable fashion. However, laser engraving is typically carried out on hard resilient materials such as wood, plastic, enamels and metals for which it is possible to remove layers of the surface through ablation without compromising the structural integrity of the original product. However, it will be readily appreciated that wafer based products are not resistant to ablation and that the use of standard laser engraving techniques will not be suitable since the laser will penetrate the fragile structure of the wafer, creating burnt areas, perforating the wafer and damaging or destroying the product to be decorated. Therefore substantial modification is required to allow such techniques to be used on wafer-based food products.

Certain techniques have attempted to make use of laser engraving based technologies to heat the surface of wafer based products to create decorations. WO 2006/129078 makes use of a colour changing substrate and discloses a method for marking an object by directing a laser beam onto the areas of the object to be marked, wherein those areas at least comprise a malonate, gluconate or heptonate. Similarly, WO2006/129086 also makes use of a colour changing substrate and discloses a method for marking an object by directing a laser beam onto the areas of the object to be marked, wherein those areas at least comprise an alginate. US 2008/0131563 discloses an edible coating layer including sugar and amino acids wherein upon radiation with a laser source the sugar and amino acids react to form a brown colour in the edible coating layer. However, these techniques all require the use of additional coatings containing colour changing additives with can detract from the normal natural ingredients of the wafer and may not be acceptable to consumers as already discussed above. Moreover, these disclosures do not explain how to use the laser technology to decorate the products without causing any damage.

JP2006248237 relates to a laser beam decoration method of ornamental objects such as baked confectioneries, in which the surfaces are irradiated with a laser beam to make the surface decorations. However, the method requires that the laser is specifically configured to deliver a defined amount of energy in a defined period of time to a defined area of the surface to be decorated. As such the apparatus requires careful recalibration of the laser source and the controller in order to operate.

A further feature of the above techniques is that the surface to be decorated is positioned inside the focal plane of the laser beam so that the point at which the laser touches the surface is the focal point of the laser beam. As a consequence the area of the surface that can be decorated is limited by the size and shape of the focal plane of the apparatus and therefore the above techniques are predominantly directed to flat, planar surfaces. In contrast, the wafer based edible receptacles that this invention is intended to be used on are formed into heterogeneous shapes such as tacos, shells, cups or cones, the surfaces of which can be curved, convex, concave or other uneven shapes. Moreover, the actual surface of these products typically has a waffle texture which introduces further features that need to be dealt with when trying to apply decorations. There therefore exists the problem of using laser based techniques for the decoration of wafer based products with non-planar or uneven surfaces.

DE 10 2006 037 922 relates to a device and a method for marking curved surfaces of foodstuffs with a laser beam. The aim of the invention is to provide a method and device that makes it possible to mark a stationary foodstuff that is fixed in a given position, from at least two solid-angle regions in order to permit marking on a curved surface of a foodstuff without having to reposition the foodstuff. By illuminating the foodstuff from at least two solid-angle regions DE 10 2006 037 922 intends to optimize the position of the surface of the object with respect to the various focal planes that are obtained to make it possible to mark a larger contiguous area of the curved surface of an object, especially in the case of essentially cylindrical or spherical surfaces. However, this disclosure involves certain drawbacks: The laser beam is split into at least 2 separate beams using a mirror or prism which causes scattering and a loss of efficiency, especially with CO2 lasers; The extra prism or mirrors introduce complexity to the apparatus; The apparatus can only be used for products which are indexed and held stationary beneath the apparatus because the beam splitter is static and cannot be used to decorating moving products on-the-fly; and Finally, DE 10 2006 037 922 specifically discloses that the surface to be decorated is positioned inside the focal planes of the split laser beams. As discussed above, wafer based products are not resistant to ablation and the use of a focussed laser beam as specified in DE 10 2006 037 922 is not suitable since the laser will perforate the fragile structure of the wafer, creating burnt areas, penetrating through the wafer and damaging or destroying the product to be decorated.

JP 2002 113585 A discloses a method and a device for immediately forming an image pattern on the surface of a food according to information of an arbitral image pattern and the food produced by the method is provided. The surface of the food is selectively irradiated with a laser beam according to a given image pattern and the image pattern is formed on the surface of the food.

DE 196 46 813 A discloses a process which generates images or legends in the surface of edible pastes on food such as meat, pastry, or confectionary, and other ready-to-eat products, by means of a carbon dioxide laser image-projection and creation system. The process is computer-controlled and leaves an image which has been captured by a scan-vector system.

DE 198 51 379 A discloses a carbon dioxide laser housed in a closed case together with a processor that can select a variety of designs from a database and/or a scanner, a drive for the laser to respond to these inputs and a carrier for the foodstuff that can be located accurately under the laser. A laser window is set at the top of a tube whose lower, open, end is normally closed by a plate. In operation the plate is drawn aside, air is blown downwards through jets and suction is applied through cups so that no greasy fumes can enter the tube. Designed for use in a retail shop the marker can be used by the staff or by customers who would pay for the service through a coin machine. The system can reproduce designs ranging from simple lines to photographs.

EP 1 604 572 A discloses a process for marking smoked food products by means of a laser beam that is guided under programmed control on the surface of the smoked food product such that the beam tracks the pattern of the mark to be reproduced, the laser beam acts only on the smoked-layer particles located at the surface of the food product, without perceptibly attacking the surface of the food product itself.

U.S. Pat. No. 5,897,797 discloses a produce (e.g. fruits and vegetables) marking system used to etch the skin of a piece of produce with an identifying mark. The first embodiment of the system uses a laser to emit a high intensity light beam to form the identifying mark. The second and third embodiments of the system use a dot matrix printer head. In the second embodiment, the pins of the printer head directly contact the produce skin to etch an area of the skin to form the identifying mark. In the third embodiment, a thermally conductive ribbon member is placed between the printer head and the produce. The pins of the printer head impact the ribbon member thereby forming a hot spot on the ribbon member, which in turn, etches the skin of the produce to form the identifying mark.

It is therefore an object of the present invention to make use of laser engraving based technologies to create decorations on wafer based products. It is a further object of the invention to make use of laser engraving based technologies to create decorations on wafer based products without the foregoing disadvantages. It is an additional object of the present invention to make use of laser engraving based technologies to create decorations on wafer based products though the use of laser engraving without the need for complex recalibration of the apparatus. It a further object of the present invention to make use of laser based technologies to create decorations on wafer based products with an uneven or non-planar surface.

SUMMARY OF THE INVENTION

It has now been found that the abovementioned objects can be achieved by using a specific apparatus and process. Therefore, in a first aspect the present invention provides a wafer product decorating apparatus comprising a laser, a collimator, at least one galvanometer-driven mirror, and an aspheric scan lens, the apparatus being positionable relative to the product to be decorated wherein the apparatus is configured to provide a laser beam having
- a spot size of from 100 to 750 µm in diameter on the surface of the wafer product to be decorated and
- a substantially flat focal plane, characterised in that
- the focal plane has a depth of field of from 5 mm to 20 mm and
- the focal plane of the laser beam is from 5 mm to 30 mm above or below the surface of the wafer product to be decorated.

The apparatus of the invention is capable of providing detailed, high resolution decorations on the wafer-based product. Moreover, it is capable of doing so without any damage to the wafer-based product. Furthermore, the apparatus is capable of providing decoration across the whole surface to be decorated even if the surface is non-planar, such as the curved, sloping surface of a cone.

Preferably the laser is a CO2 laser.

Preferably the spot size is at least 150 µm, more preferably at least 250 µm, more preferably still at least 300 µm, most preferably at least 350 µm. Preferably the spot size is at most 700 µm, more preferably at most 600 µm, more preferably still at most 550 µm, most preferably at most 500 µm.

Preferably the wafer-based product is a taco, shell, or cup. Most preferably the wafer-based product is a cone.

Preferably the focal plane of the laser beam is at least 7.5 mm above the surface of the wafer-based product that is to be decorated, more preferably at least 10 mm, more preferably still at least 12.5 mm, yet more preferably at least 15 mm. Preferably the focal plane of the laser beam is at most 27.5 mm above the surface of the wafer-based product that is to be decorated, more preferably at most 25 mm, more preferably still at most 20 mm, yet more preferably at most 17.5 mm.

In an alternative embodiment, the focal plane of the laser beam is preferably at least 7.5 mm below the surface of the wafer-based product that is to be decorated, more preferably at least 10 mm, more preferably still at least 12.5 mm, yet more preferably at least 15 mm. Preferably the focal plane of the laser beam in this embodiment is at most 27.5 mm below the surface of the wafer-based product that is to be decorated, more preferably at most 25 mm, more preferably still at most 20 mm, yet more preferably at most 17.5 mm.

Preferably the depth of field of the focal plane is at least 5.5 mm, more preferably at least 6 mm, more preferably still at least 7.5 mm, yet more preferably at least 10 mm. Preferably the depth of field of the focal plane is at most 17.5 mm, more preferably at most 15 mm, more preferably still at most 12.5 mm.

In a further aspect the invention provides a process for decorating a wafer product comprising the steps of positioning a wafer product below the apparatus of the first aspect and operating the apparatus such that the focal plane of the laser beam is from 5 mm to 30 mm above or below the surface of the wafer-based product that is to be decorated and wherein the depth of field of the focal plane of the laser beam is from 5 mm to 20 mm in depth.

Preferably the wafer-based product is a taco, shell, or cup. Most preferably the wafer-based product is a cone.

Preferably the focal plane of the laser beam is at least 7.5 mm above the surface of the wafer-based product that is to be decorated, more preferably at least 10 mm, more preferably still at least 12.5 mm, yet more preferably at least 15 mm. Preferably the focal plane of the laser beam is at most 27.5 mm above the surface of the wafer-based product that is to be decorated, more preferably at most 25 mm, more preferably still at most 20 mm, yet more preferably at most 17.5 mm.

In an alternative embodiment, the focal plane of the laser beam is preferably at least 7.5 mm below the surface of the wafer-based product that is to be decorated, more preferably at least 10 mm, more preferably still at least 12.5 mm, yet more preferably at least 15 mm.

Preferably the focal plane of the laser beam in this embodiment is at most 27.5 mm below the surface of the wafer-based product that is to be decorated, more preferably at most 25 mm, more preferably still at most 20 mm, yet more preferably at most 17.5 mm.

Preferably the depth of field of the focal plane is at least 5.5 mm, more preferably at least 6 mm, more preferably still at least 7.5 mm, yet more preferably at least 10 mm. Preferably the depth of field of the focal plane is at most 17.5 mm, more preferably at most 15 mm, more preferably still at most 12.5 mm.

DRAWINGS

DETAILED DESCRIPTION

Figure 1:
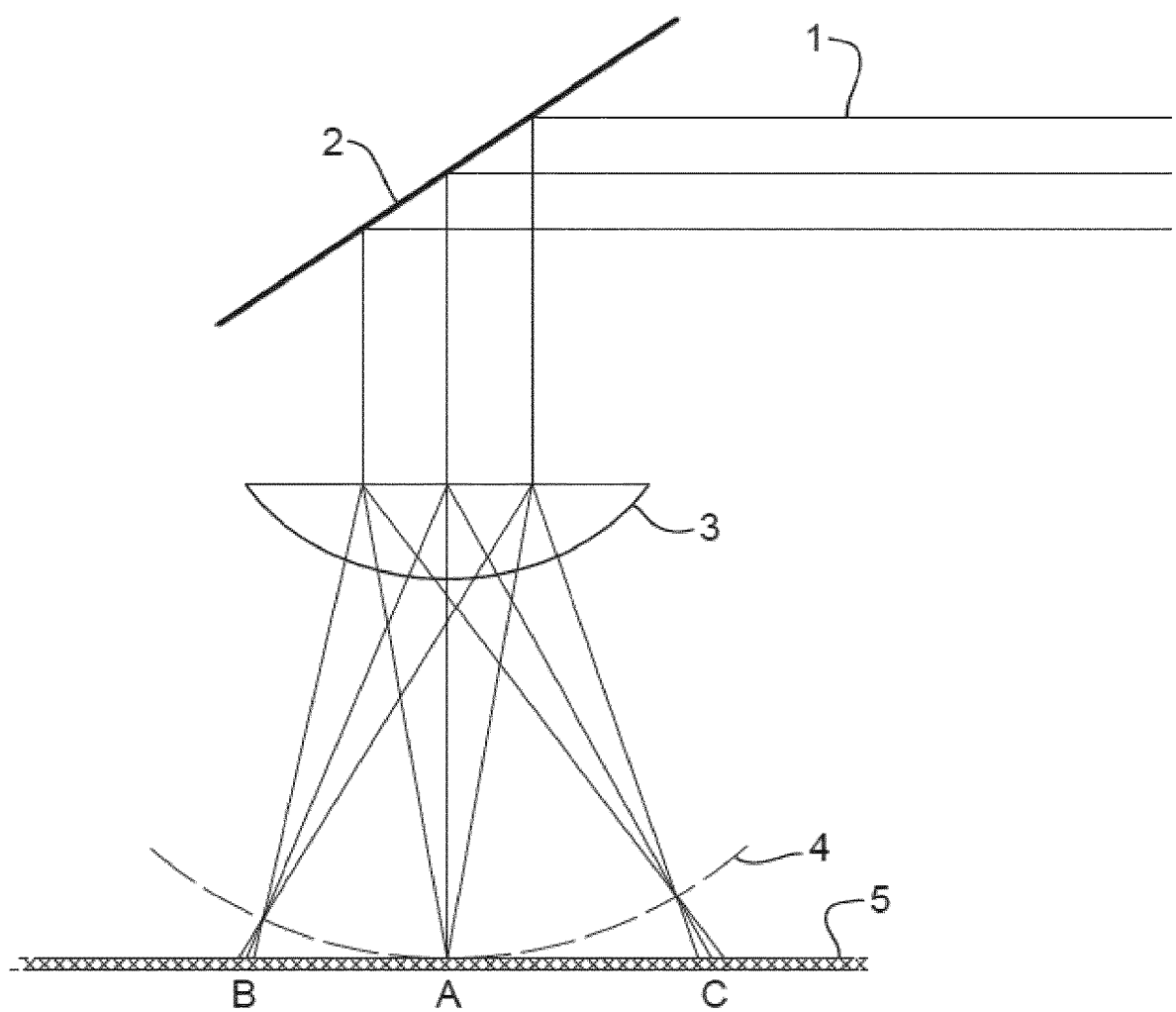
FIG. 1 shows a typical laser engraving apparatus.

The present invention relates to the use of laser technology for the decoration of wafer based products. Wafers are common components of food products, in particular composite frozen confections. Wafers are typically crisp, sweet, thin, dry biscuit confections. They can be used to add interesting features of texture, structure and flavour to the products that they are part of. Wafers are made from a batter which is largely composed of flour, sugar, fat and/or oil, and water. Once the ingredients have been mixed the batter is poured onto a baking plate, typically a metal surface heated to a temperature in excess of 200° C. During baking most of the water is driven off as steam. Due to the high sugar content of the wafers they are relatively plastic and flexible at the high temperature of the baking plate and can be formed into edible receptacles such as tacos, shells and cones. Wafers can be shaped by methods known in the art. One method for forming an edible receptacle from a wafer is by a molding process. This process includes the steps of depositing the batter into a mold; inserting a core into the mold such that the batter is forced to assume the shape of the cavity provided between the core and the mold; subjecting the mold to heat for an appropriate length of time; and discharging the cones from the mold at the completion of the specified time. Prepared receptacles are preferably discharged onto a conveyor for trimming, packing, and decorating prior to filling, storage and distribution. By this method receptacles of various shapes including but not limited to conical shapes or cups of various sizes and configurations may be made. Another method of preparing an ice-cream cone is by a rolling process. This process includes the steps of depositing the batter between two baking plates; baking a flat wafer between the plates; transferring the flat wafer sheet to a rolling device; and rolling the flat waffle into a conical shape. Ice-cream cones made by this process are sometimes referred to as sugar roll cones.

Wafer-based products may include 45 to 80 wt % wheat flour. Preferred compositions include 48 to 80 wt % wheat flour. More preferred compositions include 50 to 75 wt % wheat flour. Further preferred compositions include 55 to 70 wt % wheat flour, and optimal compositions include 58 to 65 wt % wheat flour. The wafer-based edible receptacles also include 15 to 50% by weight of sugar. Preferred compositions include at least 17%, more preferably at least 19%, still more preferably at least 21%, or even at least 25%, but preferably not more than 45%, more preferably not more than 40%, still more preferably not more than 35%, even more preferably not more than 30% by weight of sugar. They may also include 1 to 30 wt % edible oil. Preferred compositions include 1 to 15 wt % edible oil. More preferred compositions include 1 to 8 wt % oil. Further preferred compositions include 1.5 to 6 wt % oil. Still further preferred composition include 2 to 5.5 wt % of edible oil, and optimal compositions include 2.5 to 4.5 wt % edible oil. The edible oil may be selected from any of the known sources. Preferably the edible oil is a C12-C18 edible oil. Preferably the edible oil is palm oil or coconut oil. Further, the wafer-based edible receptacles may include 0 to 3 wt % lecithin. Preferred compositions include 0.1 to 2 wt % lecithin. More preferred compositions include 0.2 to 0.8 wt % lecithin. Further preferred compositions include 0.3 to 0.7 wt % lecithin. Still further preferred compositions include 0.35 to 0.65 wt % lecithin, and optimal compositions include 0.4 to 0.6 wt % lecithin. Finally, a wafer-based edible receptacle may include a small amount of water. However, in order to keep the cone crispy during storage, it is preferred that the edible receptacle is substantially free of water. By substantially free of water is meant, not more than 3%, more preferably not more than 2%, still more preferably not more than 1%, even more preferably not more than 0.5%, yet more preferably not more than 0.2%, or even less than 0.1% by weight of water.

Optional ingredients for wafer-based edible receptacles include caramel which acts as a colouring agent when added to the edible receptacle. It is an amorphous, dark-brown material that has been produced by the carefully controlled heat treatment of saccharine materials such as dextrose, invert sugar, lactose, malt syrup, molasses, sucrose, starch hydrolysates and fractions thereof, etc. The heavy-bodied, almost black syrup contains colour components that impart the amber shade found in carbonated beverages, pharmaceutical and flavoring extracts, candies, soups, bakery products, and numerous other foods. When caramel is present the edible receptacle preferably includes about 0.2 wt % of caramel. A wafer-based edible receptacle cone may also preferably include salt. Preferred salt is sodium chloride. When present the cone preferably includes about 0.2 wt % of salt. The present invention has found that laser-based technologies can be used to provide decorations on such wafers.

The apparatus of the invention includes a laser, a collimator, at least one galvanometer-driven mirror, and an aspheric scan lens. The laser may be of any suitable laser that is compatible with organic materials but in a preferred embodiment is a gas laser, preferably a tuned semi-conductive laser, more preferably a $CO_2$ laser. Preferable the laser was from 25-100 watt, more preferably 30-70 watt, more preferably still from 50-60 watt, most preferably 55 watt. The wavelength is above 3 micrometers to ensure that it is absorbed at the surface of the wafer based product and is less than 12 micrometers to remain within the lasering range. In a preferred embodiment the wavelength is from 6 to 11.5 micrometers, more preferably from 8 to 11 micrometers, most preferably 10.6 micrometers. These wavelengths provide for surface absorption which is preferred because it increases the efficiency of the process whereas if the laser transmits through the surface into the body of the product then sub-surface heating would occur causing uneven colouring and decoration and also causing structural damage to the product, weakening both the surface and the internal structure of the product. Moreover, this wavelength maximises electrical to laser power costs. Sealed $CO_2$ lasers are preferred due to their long service lifetimes and inexpensive and reliable gas recirculation. Due to the requirement to operate the apparatus in a food production environment the laser may be housed in an IP54 sealed food grade stainless steel enclosure. The laser can be air cooled but due to the size constraints in the manufacturing environment the laser is preferably water cooled to remove heat from the laser system with the minimal complexity and size. The laser may be DC excited but preferably the laser is RF excited since this delivers improved electrode life times compared with DC excited lasers.

The beam emitted from the laser source is passed through a collimator which serves to parallelise the laser beam and limit spreading of the light energy. Laser light from the lasers is typically collimated using slightly concave mirrors to ensure stability of the power output. In a preferred embodiment the divergence of the laser beam is less than 1 milliradian.

The laser beam is controlled by the at least one galvanometer-driven mirror, preferably two mirrors connected to two galvo scanners mounted orthogonally to each other. Rotating the galvos causes the mirrors to rotate which deflect the laser beam in two orthogonal angles.

In conventional systems the collimated laser beam passes through a lens suitable for a $CO_2$ laser which converts these angular movements of the mirrors into linear displacements on the marking plane. In these conventional systems the marking plane is the plane below the lens in which the laser beam is focussed to its minimum diameter. In these systems the lens can be made of ZnSe of a spherical meniscus form with two spherical surfaces with the concave surfaces facing the laser and the galvo scanning system and the convex surfaces facing the surface to be decorated. However, as can be seen in FIG. 1, such lenses produce a curved marking plane. The laser beam 1, controlled by a galvo mirror 2 enters the conventional lens 3 and is focussed as shown along a curved focal plane 4. As a consequence, it is difficult to calibrate such a system to produce accurate and consistent positions on the surface to be marked because, as can be appreciated, unless the shape of the surface to be marked corresponds exactly to the shape of the focal plane then the intensity and the shape of the laser beam will be highly variable across the surface to be decorated. FIG. 1 demonstrates the issues associated with decorating a simple flat surface 5. A spherical lens capable of producing a 180 mm marking area would have a focal length of approximately 400 mm and an acceptable scan angle of less than 0.35 radians half angle. The focal plane created by this lens would vary in height by in excess of 3 mm across the marking area which causes noticeable and unacceptable changes in the colour of the mark being applied. Moreover, the shape of the focussed laser spot also varies across the marking area. So, in the example shown in FIG. 1 the spot at point A will be focussed and therefore circular with minimal size and maximal energy density whereas the spots at points B and C will be out of focus and therefore at a lower energy. Moreover, with the system described in this scenario the spots created at points B and C will be elliptical and the ratio of the long to the short axis can be as high as 1:1.2. This further increases the area of the laser spot, decreasing the power intensity and hence the quality of the decoration. The elliptical shape of the spot also reduces the visual quality of the mark because the line width produced by the laser is different in the horizontal and vertical axes at the edges of the marking area. As can be appreciated, these issues are greatly exacerbated with the surface to be decorated is non linear, as is the situation with products such as wafer cones and the like that this invention deals with. Finally, the configuration of the conventional systems must also be very carefully controlled in order to be used to decorate the fragile structure of the wafer based products this invention deals with. Any system configured for use with standard materials such as metal, plastic, wood and the like will be too powerful for use on wafer-based material and will cause damage at least at the point of focus as denoted by point A in FIG. 1.

The present invention therefore utilises a lens type that provides a substantially flat focal plane across the marking plane. The term focal plane refers to area in which the laser beam is focussed such that the laser spot is delivering from 90 to 100% of maximal power density. By substantially flat it is meant that the focal plane created by the lens varies in height by at most 1 mm, preferably at most 0.5 mm across a 180 mm marking area. In the substantially flat focal plane of the present invention the ellipticity ratio of the long to the short axis of the laser spot in the focal plane of a 180 mm marking area is at most 1:1.1, preferably at most 1:1.05. This focal plane as provided by an aspheric scan lens has a substantial improvement over conventional lenses. As an example, an aspheric scan lens can have an increased scanning angle of 0.44 radians half angle which allows the required focal length of the lens to be reduced to 300 mm and the error in the focal plane created by this lens varies in height by only 0.5 mm across a 180 mm marking area with the ellipticity ratio of the long to the short axis reduced to 1:1.05. The apparatus of the invention also utilises a deep field of focus. The term depth of field refers to the distance across the area in which the laser is delivering a spot having from 90 to 100% of the maximal power density. Typical systems have a shallow depth of field of from 1 to 2.5 mm into which objects to be decorated are positioned. In contrast, the apparatus of the invention has a much deeper depth of field of from 5 mm to 20 mm in depth.

However, as described above, laser based decoration of wafer products presents unique challenges that must be overcome to ensure the high quality decorations are achieved without damaging the product. The present invention has surprisingly found that the surface of the wafer-based product that is to be decorated must be positioned from 5 mm to 30 mm above or below the focal plane of the laser beam. That is to say that the laser is actually defocused when it contacts the surface to be decorated.

The apparatus of the present invention therefore takes advantage of the discovery that if a specific type of lens is used and if the product to be decorated is placed in a defocused area that is from 5 mm to 30 mm outside the focal plane of the laser then a very high quality decoration can be applied to a wafer without causing structural damage and that moreover the apparatus can be used to decorate uneven, curved, and non-planar surfaces. Without wishing to be bound by theory it is believed that the specific positioning of the wafer product outside the focal plane ensures that the power delivered by the laser is sufficient to cause colour change without causing further physiochemical changes that would otherwise damage the wafer product. Moreover, the deep focal plane provides an even distribution of power across the non-planar surfaces of product shapes such as cones, cups and the like.

Figure 2:
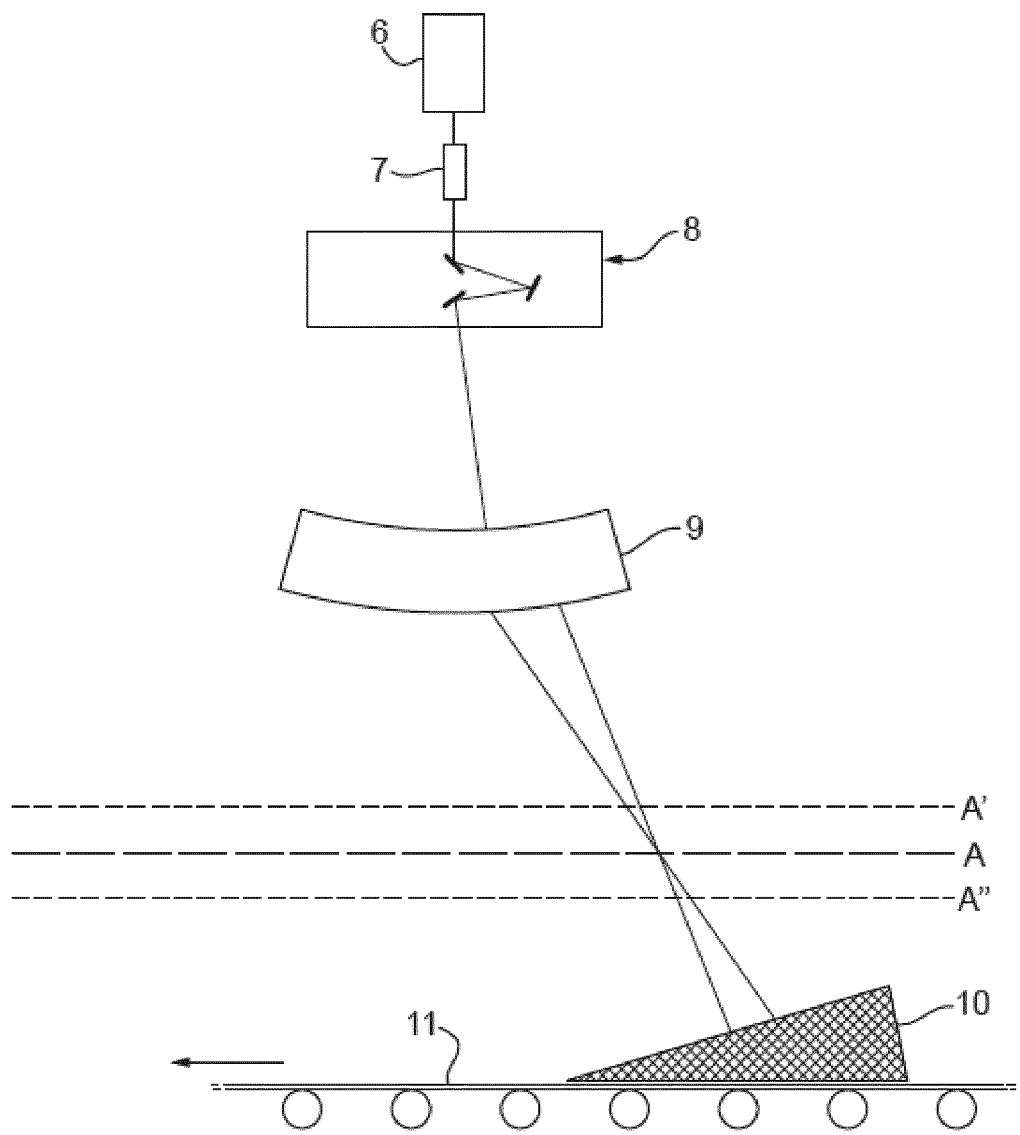
FIG. 2 shows a schematic representation of an apparatus according to the invention.

The invention will now be described with reference to FIG. 2 which shows an example of the apparatus of the invention in which a laser 6 compatible with organic materials as discussed above is provided. The laser source passes through a collimator 7 to parallelise the laser beam to a divergence of preferably less than 1 milliradian. The laser beam is then controlled by a set of galvanometer-driven mirrors 8 which are rotated to deflect the laser beam in two orthogonal angles. The beam then passes though an aspheric scan lens 9 which serves to focus the beam into a substantially flat focal plane denoted by the dashed line A. The apparatus is configured to provide a focal plane that is from 5 to 20 mm in depth the upper and lower bounds of which are shown by the dotted lines denoted A' and A" respectively. The laser is therefore fully focussed along focal plane A where the spot is at its lowest size and at 100% of the maximal power density. Along lines A' and A" the laser spot is larger and at 90% of maximal power density. Therefore in the representation of FIG. 2 anything placed within the depth of the focal plane delineated by A' and A" will be subjected to at least 90% of the maximal power density of the laser spot.

The depth of field of the focal plane is from 5 mm to 20 mm, that is to say that the distance between A' and A" is from 5 mm to 20 mm. In a preferred embodiment the depth of field of the focal plane is at least 5.5 mm, more preferably at least 6 mm, more preferably still at least 7.5 mm, yet more preferably at least 10 mm. Preferably the depth of field of the focal plane is at most 17.5 mm, more preferably at most 15 mm, more preferably still at most 12.5 mm.

As set out above, the surface of the wafer-based product that is to be decorated must be positioned from 5 mm to 30 mm above or below the focal plane of the laser beam. In the case of FIG. 2 the surface of the wafer based product that is to be decorated is positioned from 5 mm to 30 mm below line A". In the representation of FIG. 2 the product to be decorated is a cone 10 which is moved into position on a conveyer 11 moving from right to left in the direction indicated by the arrow. The cone is therefore positioned below the focal plane and the laser beam which interacts with the surface of the cone is diverging away from the point of focus and provides a spot size of from 100 to 750 µm on the surface of a wafer-based product that is to be decorated. Preferably the spot size is at least 150 µm, more preferably at least 250 µm, more preferably still at least 300 µm, most preferably at least 350 µm. Preferably the spot size is at most 700 µm, more preferably at most 600 µm, more preferably still at most 550 µm, most preferably at most 500 µm. As the spot size increases the power decreases. Therefore the power density of the laser spot on the surface of the wafer-based product that is to be decorated is less than 90% of the maximal power density, more preferably less than 89%, more preferably still less than 87.5%, yet more preferably less than 85%, most preferably less than 80%. Preferably the power density of the laser spot on the surface of the wafer-based product that is to be decorated is more than 25%, more preferably more than 50%, more preferably still more than 75%. In the representation of FIG. 2 a surface to be decorated positioned from 5 mm to 30 mm above or below the field delineated by A' or A" will be subjected to less than 90% of the maximal power density of the laser spot.

The apparatus of the invention provides a larger laser beam spot on the surface of a wafer based product that is to be decorated than with conventional laser etching techniques. The spot size is from 100 to 750 µm in diameter. The laser beam spot need not be perfectly circular and a certain level of ellipticity is acceptable. Where the laser spot shows a degree of ellipticity then the diameter of the laser spot is measured at the longest diameter of the laser spot on the surface being decorated. Preferably the spot size is at least 150 µm, more preferably at least 250 µm, more preferably still at least 300 µm, most preferably at least 350 µm. Preferably the spot size is at most 700 µm, more preferably at most 600 µm, more preferably still at most 550 µm, most preferably at most 500 µm.

It will therefore be appreciated that the present invention utilises parameters that are far outside the norm of conventional laser decoration techniques including the use of a larger laser spot size and actually positioning the surface to be decorated outside the focal plane of the laser. Nevertheless, it has been found that these features ensure that the apparatus is capable of providing detailed decorations with high resolution on wafer based products. Moreover, the decorations are provided without causing damage to the fragile wafer surface and the apparatus can be used to decorate any shape of wafer based product including flat surfaces but is particularly suited for decorating non-planar surfaces and so the wafer based product can also be a taco, shell, cup, cone or the like.

In use, the wafer based product to be decorated is positioned below the apparatus. The product can be positioned using any suitable means such as a robotic arm, indexer or a conveyer belt. The laser is configured to provide a laser beam having a wavelength above 3 micrometers and less than 12 micrometers. In a preferred embodiment the wavelength is from 6 to 11.5 micrometers, more preferably from 8 to 11 micrometers, most preferably 10.6 micrometers. The laser beam passes through a collimator and is parallelised to limit spreading of the light energy such that the divergence of the laser beam is preferably less than 1 milliradian. The movement of the laser beam is then controlled by at least one galvanometer-driven mirror which deflects the laser beam in two orthogonal angles and thus controls the movement of the laser beam over the surface to be decorated. The beam is focussed through an aspheric scan lens which serves to focus the laser beam into a substantially flat focal plane that is from 5 to 20 mm in depth.

The surface of the wafer-based product that is to be decorated is then positioned from 5 mm to 30 mm above or below the focal plane of the laser beam. In the representation of FIG. 2 the product to be decorated is a cone 10 which is moved into position on a conveyer 11 moving from right to left in the direction indicated by the arrow. In this embodiment the cone is positioned below the focal plane and so the laser beam which interacts with the surface of the cone is diverging away from the point of focus. In an alternative embodiment, when the surface of the wafer-based being decorated is positioned above the focal plane, the laser beam is converging. In either embodiment, the laser beam provides a spot size of from 100 to 750 µm on the surface of that is to be decorated.

Different patterns can be provided by programming a controller to cause the mirrors to move the laser beam across a particular path. The path of the laser beam can be carefully regulated to achieve a consistent delivery of energy and therefore a consistent colour change across the decoration. For example, criss-crossed paths are avoided to ensure that areas on the surface being decorated are exposed to the laser only once, so that all areas of material are affected by the same amount of laser energy. Moreover, the apparatus of the invention can be used to decorate objects that are indexed below the apparatus—i.e. the object is positioned under the apparatus and is stationary while the mirrors cause the laser to scan across the surface to create the decoration. Alternatively and advantageously the apparatus can be used to decorate objects on-the-fly, i.e. the objects pass continuously beneath the apparatus and the mirrors are controlled to cause the laser to simultaneously track the object and scan across the surface to create the decoration.

The present invention will now be further described with reference to the following non-limiting examples.

EXAMPLES

Batter was prepared according to the formulation given in Table 1 and formed into sugar roll cones having a widest diameter of approx. 50 mm at the top and a length of approx. 250 mm.

TABLE 1

| Wafer batter composition | |
|---|---|
| Ingredient | wt % |
| Wheat flour | 35.46 |
| Potato starch | 1.88 |
| Sucrose | 15.53 |
| Salt | 0.56 |
| Coconut oil (fully refined) | 14.35 |
| Vanilla flavour | 0.05 |
| Sunflower Lecithin | 0.23 |
| Caramelised Sugar Syrup (57% total solids) | 0.38 |
| Water | 31.57 |

The laser used was a Razor 55w Laser Marking System: CDRH Class IV, with a $CO_2$ laser type having a maximum average output power of 55 Watts, modulated CW with a wavelength of 10.6·m, power Stability ±5%, mode Quality (M2) <1.2, operating Frequency & Duty cycle 0 to 25 kHz, marking speed 5,000 mm·s-1, beam profile TEM00*, water cooled sourced from Electrox, Avenue One, The Business Park, Letchworth Garden City, Hertfordshire SG6 2HB, United Kingdom. Digitally controlled 15 mm high speed galvanometers were used, sourced from II-VI Infrared, 375 Saxonburg Blvd., Saxonburg, Pa. The laser housing was NEMA 12 & IP 55 sealed with integral resonator dust seals.

The lens was a flat field 300 mm lens providing a marking area of 210 mm in diameter. The focal plane was approx. 310 mm from the lens with a focal depth of approx 15 mm. The cones were provided on a conveyer moving at a speed of 6 m/min positioned approx. 20 mm below the focal plane. In this configuration the spot size was approx. 400 μm in diameter on the surface of the product to be decorated. The area to be decorated on the cones measured approx. 25 mm×25 mm.

Figure 3:
FIG. 3 shows a variety of decorations applied to cones using an apparatus according to the invention.
Figure 3:

This apparatus was used to decorate a variety of decorations onto the cones which are shown in FIG. 3 in which is can be seen that the laser based technique of the present invention is able to create decorations on wafer based products without the use of colour changing additives. Moreover this apparatus was able to create consistently detailed and high resolution decorations on cone products that had a surface that was uneven, curved, sloping and tapering. Moreover this apparatus was able to create these decorations on these wafer cone products without causing any damage to the surface.

The invention claimed is:

1. A wafer product decorating apparatus comprising a laser (6), a collimator (7), at least one galvanometer driven mirror (8), and an aspheric scan lens (9), the apparatus being positionable relative to the wafer product to be decorated wherein the apparatus is configured to provide a laser beam having
 a spot size of from 100 to 750 μm in diameter on the surface of the product to be decorated and
 a substantially flat focal plane,
 characterised in that
 the focal plane has a depth of field of from 5 mm to 20 mm and that
 the focal plane of the laser beam is from 5 mm to 30 mm above or below the surface of the product to be decorated, wherein the wafer product is a cone.

2. An apparatus according to claim 1 wherein the laser is a $CO_2$ laser.

3. An apparatus according to claim 1 wherein the spot size is from 150 μm to 700 μm in diameter.

4. An apparatus according to any of claim 1 wherein the spot size is from 250 μm to 600 μm in diameter.

5. An apparatus according to claim 1 wherein the focal plane of the laser beam is from 7.5 mm to 27.5 mm above the surface of the wafer-based product that is to be decorated.

6. An apparatus according to claim 1 wherein the focal plane of the laser beam is from 7.5 mm to 27.5 mm below the surface of the wafer-based product that is to be decorated.

7. An apparatus according to claim 1 wherein the depth of field of the focal plane is from 5.5 mm to 17.5 mm.

* * * * *